US011909130B2

(12) United States Patent
Li

(10) Patent No.: US 11,909,130 B2
(45) Date of Patent: Feb. 20, 2024

(54) ANTENNA STRUCTURE AND COMMUNICATIONS TERMINAL

(71) Applicant: VIVO MOBILE COMMUNICATION CO., LTD., Guangdong (CN)

(72) Inventor: Rihui Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 357 days.

(21) Appl. No.: 17/345,193

(22) Filed: Jun. 11, 2021

(65) Prior Publication Data

US 2021/0305703 A1 Sep. 30, 2021

Related U.S. Application Data

(63) Continuation of application No. PCT/CN2019/117441, filed on Nov. 12, 2019.

(30) Foreign Application Priority Data

Dec. 12, 2018 (CN) ......................... 201811521132.3

(51) Int. Cl.
*H01Q 5/328* (2015.01)
*H01Q 5/335* (2015.01)
*H01Q 9/04* (2006.01)

(52) U.S. Cl.
CPC ........... *H01Q 9/0442* (2013.01); *H01Q 5/328* (2015.01); *H01Q 9/0414* (2013.01)

(58) Field of Classification Search
CPC .......... H01Q 1/24; H01Q 1/241; H01Q 1/243; H01Q 5/10; H01Q 5/328; H01Q 5/335;
(Continued)

(56) References Cited

U.S. PATENT DOCUMENTS 7,768,466 B2 * 8/2010 Chi .......................... H01Q 9/26 343/741
9,980,018 B2 * 5/2018 Wong ..................... H01Q 5/328
2009/0256763 A1 10/2009 Chi et al.
2013/0002501 A1 * 1/2013 Li ........................... H01Q 5/35 343/866

(Continued)

FOREIGN PATENT DOCUMENTS

CN 104283004 A 1/2015
CN 104993241 A * 10/2015

(Continued)

OTHER PUBLICATIONS

International Search Report and Written Opinion of the International Searching Authority regarding International Patent Application No. PCT/CN2019/117441, dated Feb. 18, 2020. Translation provided by Bohui Intellectual Property.

(Continued)

*Primary Examiner* — Thai Pham
(74) *Attorney, Agent, or Firm* — Harness, Dickey & Pierce, P.L.C.

(57) ABSTRACT

An antenna structure includes a first antenna radiator, a second antenna radiator, and a first impedance matching circuit. The first antenna radiator and the second antenna radiator are disposed in a laminated or opposite manner, and a gap exists between the first antenna radiator and the second antenna radiator. The length of the first antenna radiator is greater than that of the second antenna radiator, and the resonant frequency band of the first antenna radiator is smaller than that of the second antenna radiator. The first end of the first antenna radiator is grounded, a first feeding point is provided on the first antenna radiator. The first end of the second antenna radiator is grounded, a second feeding point is provided on the second antenna radiator, and the second feeding point is connected to a second signal source.

20 Claims, 4 Drawing Sheets

(58) Field of Classification Search
CPC .. H01Q 5/40; H01Q 5/50; H01Q 9/04; H01Q 9/0414; H01Q 9/0442; H01Q 9/42
See application file for complete search history.

(56) References Cited

U.S. PATENT DOCUMENTS

| | | | | |
|---|---|---|---|---|
| 2013/0099980 | A1* | 4/2013 | Hayashi | H01Q 5/385 343/700 MS |
| 2014/0078018 | A1* | 3/2014 | Wong | H01Q 1/523 343/893 |
| 2017/0162948 | A1* | 6/2017 | Wong | H01Q 5/10 |
| 2021/0273340 | A1* | 9/2021 | Sun | H01Q 5/10 |

FOREIGN PATENT DOCUMENTS

| | | | | |
|---|---|---|---|---|
| CN | 108346863 | A | | 7/2018 |
| CN | 207800915 | U | * | 8/2018 |
| CN | 108631041 | A | | 10/2018 |
| CN | 108832267 | A | | 11/2018 |
| CN | 108879116 | A | | 11/2018 |
| CN | 109546311 | A | | 3/2019 |

OTHER PUBLICATIONS

First Office Action regarding Chinese Patent Application No. 201811521132.3, dated Dec. 13, 2019. Translation provided by Bohui Intellectual Property.

Second Office Action regarding Chinese Patent Application No. 201811521132.3, dated Jun. 2, 2020. Translation provided by Bohui Intellectual Property.

Supplementary European Search Report regarding Patent Application No. 19895745.8-1205/3896790; PCT/CN2019/117441, dated Jan. 4, 2022.

* cited by examiner

ANTENNA STRUCTURE AND COMMUNICATIONS TERMINAL

CROSS-REFERENCE OF RELATED APPLICATIONS

This application is a Bypass Continuation Application of PCT/CN2019/117441 filed on Nov. 12, 2019, which claims priority to Chinese Patent Application No. 201811521132.3 filed on Dec. 12, 2018, which are incorporated herein by reference in their entirety.

TECHNICAL FIELD

The present disclosure relates to the field of communications technologies, and in particular, to an antenna structure and a communications terminal.

BACKGROUND

With the development and progress of science and technologies, communication technologies are rapidly developed and greatly advanced. The popularity of communications terminals such as mobile phones is unprecedented, and their functions are increasingly improved. At the same time, users also attach importance to the appearance and texture of communications terminals, and communications terminals with metal shells are popular among more and more users due to excellent metal texture.

Communications terminals in the appearance of a metal middle frame or an all-metal battery cover common in daily life are generally provided with antennas. Currently, there are many antennas in communications terminals, for example, a primary antenna, a diversity antenna, a positioning antenna, and a WWI 2.4G antenna, which occupy more and more space in the entire system. In related art, communications terminals can work in a new band generally by designing an independent antenna. However, the design of an independent antenna requires that a new antenna is spaced from an original antenna by a long distance or a certain width of ground wall is added to solve the problem of isolation between antennas.

It can be seen that communications terminals in the related art have the problem that antennas occupy large space.

SUMMARY

According to a first aspect, the embodiments of the present disclosure provide an antenna structure, applied to a communications terminal, including a first antenna radiator, a second antenna radiator, a first impedance matching circuit, a first signal source, and a second signal source; wherein

- the first antenna radiator and the second antenna radiator are stacked or disposed relative to each other, and there is a gap between the first antenna radiator and the second antenna radiator;
- a length of the first antenna radiator is greater than a length of the second antenna radiator, and a resonance band of the first antenna radiator is less than a resonance band of the second antenna radiator;
- a first end of the first antenna radiator is grounded, the first antenna radiator is provided with a first feed point, the first feed point is connected to a first terminal of the first signal source through the first impedance matching circuit, and a second terminal of the first signal source is grounded; and
- a first end of the second antenna radiator is grounded, the second antenna radiator is provided with a second feed point, the second feed point is connected to a first terminal of the second signal source, and a second terminal of the second signal source is grounded.

According to a second aspect, the embodiments of the present disclosure provide a communications terminal, including the antenna structure provided in the embodiments of the present disclosure.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
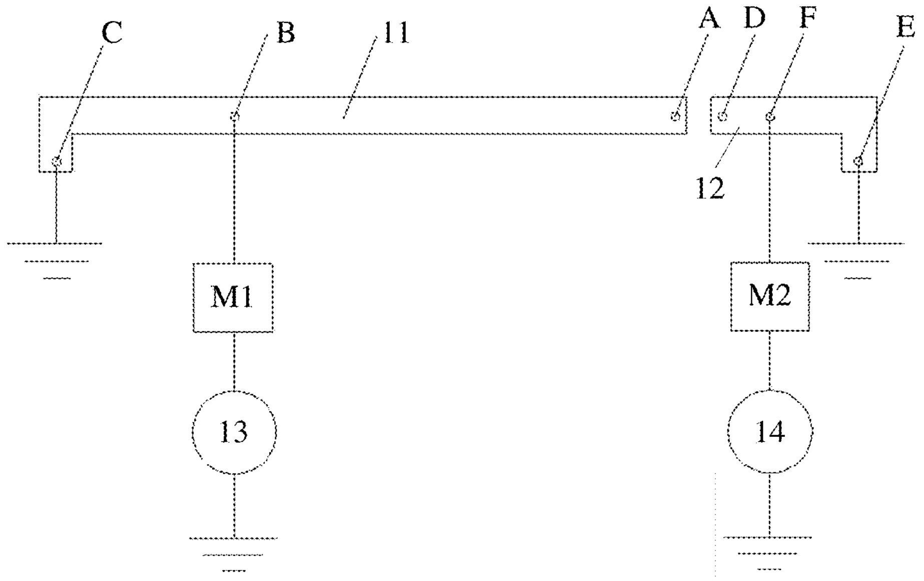
FIG. 1 is a schematic diagram of an antenna structure according to an embodiment of the present disclosure.

Referring to FIG. 1, FIG. 1 is a schematic diagram of an antenna structure according to an embodiment of the present disclosure. The antenna structure is applied to a communications terminal. As shown in FIG. 1, the antenna structure includes a first antenna radiator 11, a second antenna radiator 12, a first impedance matching circuit M1, a first signal source 13, and a second signal source 14;

- the first antenna radiator 11 and the second antenna radiator 12 are stacked or disposed relative to each other, and there is a gap between the first antenna radiator 11 and the second antenna radiator 12; wherein a length of the first antenna radiator 11 is greater than a length of the second antenna radiator 12, and a resonance band of the first antenna radiator 11 is less than a resonance band of the second antenna radiator 12;

a first end C of the first antenna radiator 11 is grounded, a second end A of the first antenna radiator 11 is an open end, the first antenna radiator 11 is provided with a first feed point B, the first feed point B is connected to a first terminal of the first signal source 13 through the first impedance matching circuit M1, and a second terminal of the first signal source 13 is grounded; and a first end E of the second antenna radiator 12 is grounded, a second end D of the second antenna radiator 12 is an open end, the second antenna radiator 12 is provided with a second feed point F, the second feed point F is connected to a first terminal of the second signal source 14, and a second terminal of the second signal source 14 is grounded.

In the embodiments of the present disclosure, as shown in FIG. 1, the antenna structure includes the first antenna radiator 11 and the second antenna radiator 12. The first antenna radiator 11 can be configured to receive a signal of a first target band, such as signals of a positioning band (1.55 GHz to 1.62 GHz) and a WIFI 2.4G band (2.4 GHz to 2.5 GHz). The second antenna radiator 12 can be configured to receive a signal of a second target band, such as signals of a sub-6G band (3.3 GHz to 3.8 GHz and 4.4 GHz to 5 GHz) or a WIFI 5G band (5.15 GHz to 5.85 GHz). The first target band and the second target band are bands in which the first antenna radiator 11 and the second antenna radiator 12 generate resonance. WIFI 2.4G refers to a radio wave band at 2.4 GHz, WIFI 5G refers to a radio wave band at 5 GHz, and sub-6G refers to a radio wave band below 6 GHz.

The first antenna radiator 11 and the second antenna radiator 12 can be stacked, and there is a gap between the first antenna radiator 11 and the second antenna radiator 12. For example, in the communications terminal, the second antenna radiator 12 can be completely or partially disposed directly below the first antenna radiator 11 to share all or a part of the space. When the entire space is shared, antenna space can be minimized. When the first antenna radiator 11 and the second antenna radiator 12 are stacked, both the first end C of the first antenna radiator 11 and the first end E of the second antenna radiator 12 can be any end.

The first antenna radiator 11 and the second antenna radiator 12 can also be disposed relative to each other, and there is a gap between the first antenna radiator 11 and the second antenna radiator 12. For example, in the communications terminal, when the metal frame or the metal shell of the communications terminal is used as an antenna radiator, the first antenna radiator 11 and the second antenna radiator 12 can be disposed relative to each other and share an antenna fracture, to reduce the number of fractures, reduce the space occupied by the antenna, and meet the appearance design requirement of the communications terminal. For example, the second end D of the second antenna radiator 12 and the second end A of the first antenna radiator 11 share a fracture, and the distance between the second end D of the second antenna radiator 12 and the second end A of the first antenna radiator 11 can be from 0.3 mm to 2.5 mm, and an optional value is 1.5 mm.

In the embodiment of the present disclosure, the length AC of the first antenna radiator 11 is greater than the length DE of the second antenna radiator 12, and the resonance band of the first antenna radiator 11 is lower than the resonance band of the second antenna radiator 12. In this way, because the length of the second antenna radiator 12 is shorter, the impedance of the second feed point F in the resonance band (lower band) of the first antenna radiator 11 is equivalent to low impedance, which can block a signal of the resonance band of the first antenna radiator 11 from passing through, to improve isolation of the antenna.

Figure 2:
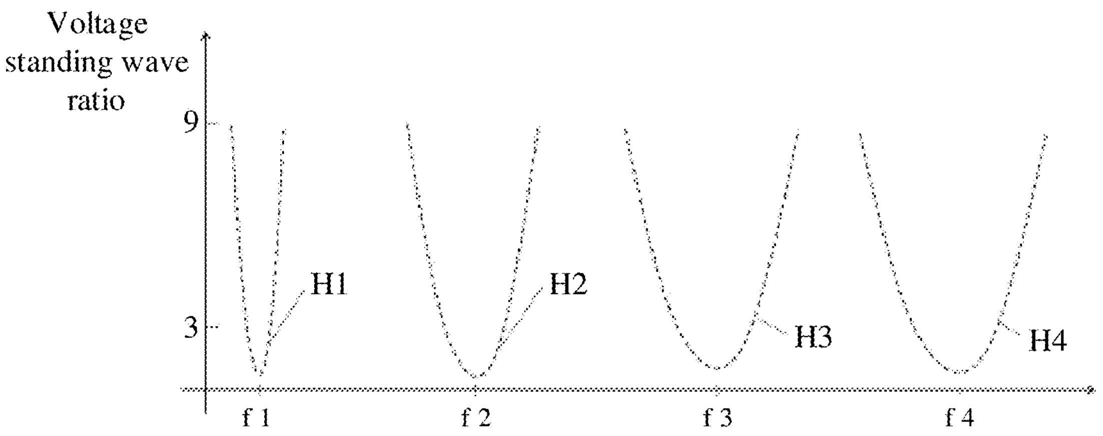
FIG. 2 is a schematic diagram of resonance modes generated in an antenna structure according to an embodiment of the present disclosure.

The first end C of the first antenna radiator 11 is grounded, the second end A of the first antenna radiator 11 is an open end, the first feed point B is disposed on the first antenna radiator 11, the first feed point B is connected to the first terminal of the first signal source 13 through the first impedance matching circuit M1, and the second terminal of the first signal source 13 is grounded. The first impedance matching circuit M1 can be a circuit formed by connecting inductors, capacitors, or the like in series or in parallel, and is configured to enable the first antenna radiator 11 to generate a resonance mode in the first target band, and match the impedance of the first target band to 50 ohms. For example, as shown in FIG. 2, the first antenna radiator 11 is enabled to generate a first resonance mode H1 in the 1.55 GHz to 1.62 GHz band (center frequency f1), generate a second resonance mode H2 in the 2.4 GHz to 2.5 GHz band (center frequency f2), and can also present a high-impedance property for the resonance band of the second antenna radiator 12 to block a signal of the resonance band of the second antenna radiator 12 from entering the first signal source, to improve isolation of the antenna. The specific circuit composition of the first impedance matching circuit M1 can be designed according to the operating band of the first antenna radiator 11.

The first end E of the second antenna radiator 12 is grounded, the second end D of the second antenna radiator 12 is an open end, the second feed point F is disposed on the second antenna radiator 12, and the second feed point F can be directly connected to the first terminal of the second signal source 14 or is connected to the first terminal of the second signal source 14 through the impedance matching circuit. For example, whether the second feed point F is directly connected to the first terminal of the second signal source 14 or is connected to the first terminal of the second signal source 14 by designing a suitable impedance matching circuit can be determined based on the operating band of the second antenna radiator 12, the length DE of the second antenna radiator 12, and the location of the second feed point F, so that the second antenna radiator 12 generates a resonance mode in the second target band. For example, as shown in FIG. 2, the second antenna radiator 12 is enabled to generate a third resonance mode H3 in the 3.3 GHz to 3.8 GHz band (center frequency f3), generate a fourth resonance mode H4 in the 4.4 GHz to 5 GHz band (center frequency f4), and can present a low-impedance property for the resonance band of the first antenna radiator 11, to block a signal of the resonance band of the first antenna radiator 11 from entering the second signal source 14. The second terminal of the second signal source 14 is grounded.

As shown in FIG. 1, when the first antenna radiator 11 and the second antenna radiator 12 are disposed relative to each other, the first end C of the first antenna radiator 11 is an end away from the second antenna radiator 12, and the first end E of the second antenna radiator 12 is an end away from the first antenna radiator 11. In this way, the first antenna radiator 11 and the second antenna radiator 12 can share an antenna fracture, reducing the space occupied by the antenna.

Figure 3:
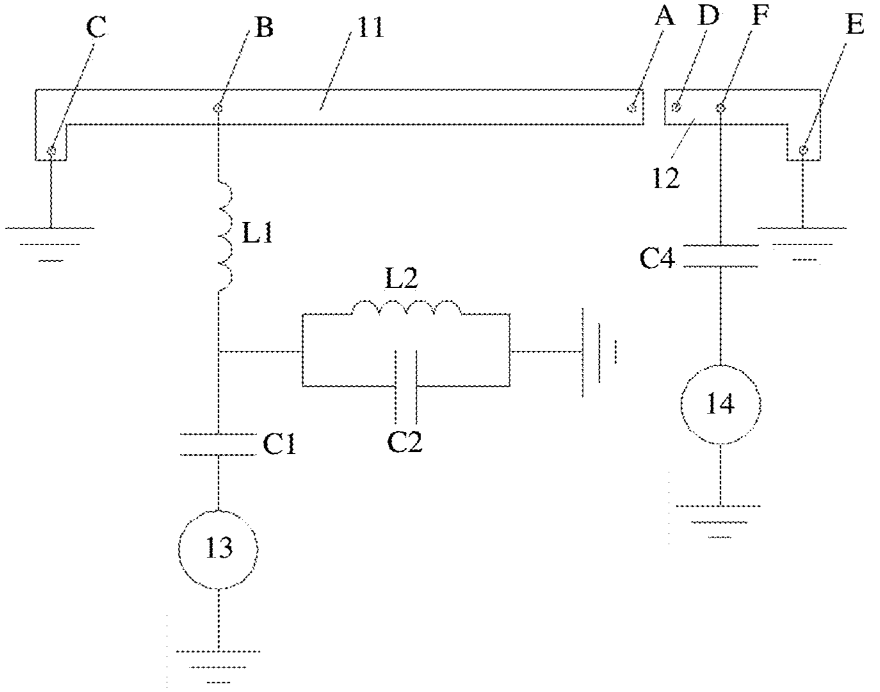
FIG. 3 is a schematic diagram of another antenna structure according to an embodiment of the present disclosure.

Optionally, as shown in FIG. 3, the first impedance matching circuit M1 includes: a first inductor L1 and a first capacitor C1, a first terminal of the first inductor L1 is connected to the first feed point B, a second terminal of the first inductor L1 is connected to a first terminal of the first capacitor C1, and a second terminal of the first capacitor C1 is connected to the first terminal of the first signal source 13.

In an implementation, the first impedance matching circuit M1 may include: a first inductor L1 and a first capacitor C1, a first terminal of the first inductor L1 is connected to the first feed point B, the first inductor L1 is connected to the first capacitor C1 in series, and a second terminal of the first capacitor C1 is connected to the first terminal of the first signal source 13. In this way, the first impedance matching circuit M1 can effectively excite the first antenna radiator 11 to generate the first resonance mode H1 and the second resonance mode H2, and can present a high-impedance property for the resonance band of the second antenna radiator 12, to block the signal of the resonance band of the second antenna radiator 12 from passing through. In addition, by adjusting parameter values of the first inductor L1 and the first capacitor C1, a ratio of the resonance frequency of the first antenna radiator 11 in the second resonance mode H2 to the resonance frequency in the first resonance mode H1 can be less than 2, which meets the frequency ratio requirement so that the first antenna radiator 11 generates a resonance mode in the WIFI 2.4G band of 2.4 GHz to 2.5 GHz and the positioning band of 1.55 GHz to 1.62 GHz.

When the first impedance matching circuit M1 is used to enable the first antenna radiator 11 to generate the resonance mode in the 1.55 GHz to 1.62 GHz band and the 2.4 GHz to 2.5 GHz band, the value of the first inductor L1 can be from 5 nH to 10 nH and the optional value is 8 nH, and the value of the first capacitor C1 can be from 0.4 pF to 1 pF and the optional value is 0.5 pF. The values of the first inductor L1 and the first capacitor C1 can be determined according to the resonance band of the first antenna radiator 11.

Optionally, as shown in FIG. 3, the first impedance matching circuit M1 further includes: a second inductor L2 and a second capacitor C2, a first terminal of the second inductor L2 is connected to the second terminal of the first inductor L1, a second terminal of the second inductor L2 is grounded, a first terminal of the second capacitor C2 is connected to the first terminal of the second inductor L2, and a second terminal of the second capacitor C2 is grounded.

When the first impedance matching circuit M1 only includes the first inductor L1 and the first capacitor C1, a resonance circuit formed by the first inductor L1 and the first capacitor C1 has high heat loss and a poor antenna voltage standing wave ratio. Therefore, to reduce the voltage standing wave ratio of the first antenna radiator 11 in the resonance band and the heat loss of the first impedance matching circuit M1, a second inductor L2 and a second capacitor C2 can be added to the first impedance matching circuit M1. A first terminal of the second inductor L2 is connected to a second terminal of the first inductor L1, a second terminal of the second inductor L2 is grounded, and the second capacitor C2 is connected to the second inductor L2 in parallel. In this way, the first impedance matching circuit M1 can effectively excite the two resonance modes of the first antenna radiator 11, and the first inductor L1 and the second capacitor C2 present a high-impedance and low-pass property, which can effectively block the signal of the resonance band of the second antenna radiator 12 from passing through, further improving antenna efficiency.

The value of the first inductor L1 can be from 1.5 nH to 6 nH and the optional value is 3 nH, the value of the first capacitor C1 can be from 0.4 pF to 1.2 pF and the optional value is 0.5 pF, the value of the second inductor L2 can be from 10 nH to 68 nH and the optional value is 16 nH, and the value of the second capacitor C2 is from 0.3 pF to 1.2 pF and the optional value is 0.7 pF.

Figure 4:
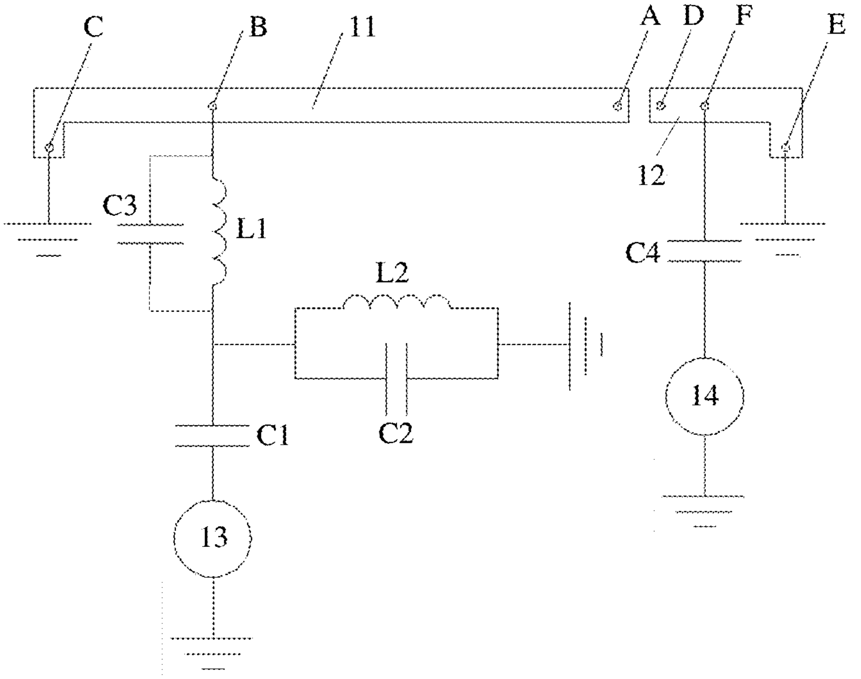
FIG. 4 is a schematic diagram of another antenna structure according to an embodiment of the present disclosure.

Optionally, to further block the signal of the resonance band of the second antenna radiator 12 from passing through, as shown in FIG. 4, the first impedance matching circuit M1 may further include a third capacitor C3. A first terminal of the third capacitor C3 is connected to the first terminal of the first inductor L1, and a second terminal of the third capacitor C3 is connected to the second terminal of the first inductor L1. That is, a capacitor is connected in parallel at both terminals of the first inductor L1. In this way, the first inductor L1 and the third capacitor C3 form resonators in parallel. A higher impedance can be presented in the resonance band of the second antenna radiator 12, to further improve isolation of the resonance band of the second antenna radiator 12.

Optionally, as shown in FIG. 1, the antenna structure further includes: a second impedance matching circuit M2, where the second feed point F is connected to the first terminal of the second signal source 14 through the second impedance matching circuit M2.

To better excite the second antenna radiator 12 to generate the resonance mode and improve isolation of the signal of the resonance band of the first antenna radiator 11, the second impedance matching circuit M2 can be disposed between the second feed point F and the second signal source 14, that is, the second feed point F can be connected to the second signal source 14 through the second impedance matching circuit M2. The second impedance matching circuit M2 can be configured to excite the second antenna radiator 12 to generate the resonance mode in the second target band, such as excite the second antenna radiator 12 to generate the resonance mode in a sub-6G band or a WIFI 5G band, match the impedance of the second target band to 50 ohms, and isolate the signal of the resonance band of the first antenna radiator 11.

The second impedance matching circuit M2 can include a fourth capacitor and/or a third inductor. In some examples, it can be designed according to the operating band of the second antenna radiator 12 and the length DE of the second antenna radiator 12 or the position of the second feed point F.

In an implementation, as shown in FIG. 3, the second impedance matching circuit M2 may include a fourth capacitor C4, and the value of the fourth capacitor C4 is from 0.2 pF to 1 pF and the optional value is 0.4 pF. In this way, the fourth capacitor C4 can effectively excite the second antenna radiator 12 to generate two resonance modes. An antenna section FE between the second feed point F and the first end E of the second antenna radiator 12 can be equivalent to a small inductor in the resonance band of the first antenna radiator 11. Therefore, the fourth capacitor C4 and the antenna section FE can present a high-pass low-impedance property, which can block the signal of the resonance band of the first antenna radiator 11 from entering the second signal source 14.

It should be noted that to further block the signal of the resonance band of the first antenna radiator 11 from entering the second signal source 14, an inductor can be connected in parallel between the second feed point F and the ground, or the length FE from the second feed point F to the first end E of the second antenna radiator 12 can be reduced properly (for example, the position of the second feed point F is properly moved towards the first end E of the second antenna radiator 12 or the length FE is directly reduced), to increase isolation of the signal of the resonance band of the first antenna radiator 11 by the second antenna radiator 12.

In another implementation, to make the ratio of the resonance frequency of the second antenna radiator 12 in the fourth resonance mode H4 to the resonance frequency in the third resonance mode H3 less than 2 to meet the frequency ratio of 4.4 GHz to 5 GHz band and 3.3 GHz to 3.8 GHz band, the length DF from the second end D of the second antenna radiator 12 to the second feed point F can be increased properly (for example, the position of the second feed point F is properly moved towards the first end E of the second antenna radiator 12), to reduce the resonance frequency of the second antenna radiator 12 in the fourth resonance mode H4.

Figure 5:
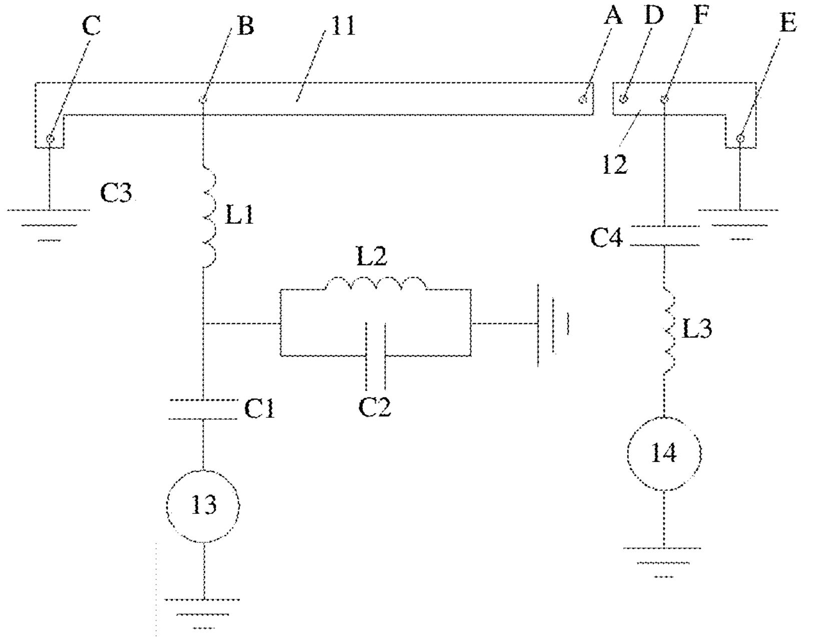
FIG. 5 is a schematic diagram of another antenna structure according to an embodiment of the present disclosure.

Alternatively, as shown in FIG. 5, a third inductor L3 is connected in series between the fourth capacitor C4 and the second signal source 14, to reduce the resonance frequency of the second antenna radiator 12 in the fourth the resonance mode H4. That is, a first terminal of the fourth capacitor C4 is connected to the second feed point F, a second terminal of the fourth capacitor C4 is connected to a first terminal of the third inductor L3, and a second terminal of the third inductor L3 is connected to the first terminal of the second signal source 14.

Figure 6:
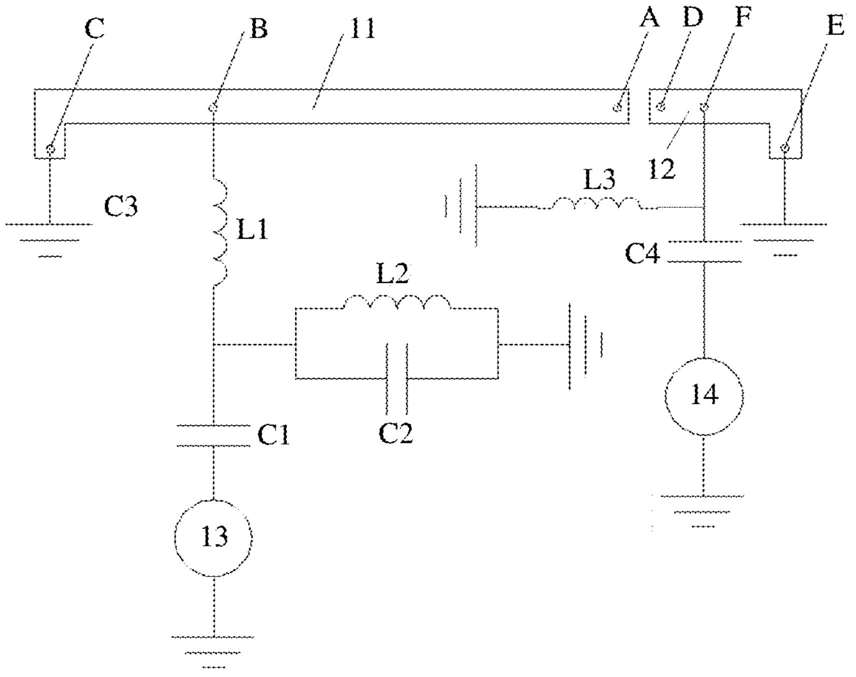
FIG. 6 is a schematic diagram of another antenna structure according to an embodiment of the present disclosure.

As shown in FIG. 6, a third inductor L3 is connected in parallel between the second feeding point F and the ground, to increase the resonant frequency of the second antenna radiator 12 in the third resonant mode H3. That is, a first terminal of the fourth capacitor C4 is connected to the second feed point F, a second terminal of the fourth capacitor C4 is connected to the first terminal of the second signal source 14, a first terminal of the third inductor L3 is connected to the second feed point F, and a second terminal of the third inductor L3 is grounded.

It should be noted that when the second antenna radiator 12 only needs to generate the resonance mode in the WIFI 5G band, the length DE of the second antenna radiator 12 or the position of the second feed point F can satisfy that when the impedance of the WIFI 5G band is matched to 50 ohms, the second feed point F can be directly connected to the first terminal of the second signal source 14 without disposing an impedance matching circuit. For example, when the length DE of the second antenna radiator 12 is 7 mm and the length DF from the second feed point F to the second end D of the second antenna radiator 12 is 6 mm, the antenna section FE is equivalent to a small inductor of about 2 nH in a positioning band and a WIFI 2.4G band, and the antenna section DF is equivalent to a capacitor in a positioning band and a WIFI 2.4G band. Therefore, the second antenna radiator 12 can generate the resonance mode in a WIFI 5G band, and is equivalent to a high-pass filter, which can effectively block the signal of the resonance band of the first antenna radiator 11 from entering the second signal source 14. Therefore, higher isolation can be obtained without disposing an impedance matching circuit between the second feed point F and the second signal source 14.

In the embodiments of the present disclosure, when the first impedance matching circuit M1 includes the first inductor L1 and the first capacitor C1, or includes the first inductor L1, the first capacitor C1, the second inductor L2, and the second capacitor C2, to ensure that radiation performance of the first antenna radiator 11 is desirable in its resonance band, the length AC of the first antenna radiator 11 and the position of the first feed point B can be designed to meet specific requirements.

For example, the length AC of the first antenna radiator 11 can be designed to be between a 3/16 wavelength and a 3/8 wavelength of a first band of the resonance bands of the first antenna radiator 11, and can be selected to be close to a 1/4 wavelength of the first band. A length AB from the first feed point B to the second end A of the first antenna radiator 11 can be designed to be smaller than a 3/8 wavelength of the second band of the resonance bands of the first antenna radiator 11. A length BC from the first feed point B to the first end C of the first antenna radiator 11 is greater than 1/20 of the length AC of the first antenna radiator 11.

A center frequency of the second band is higher than a center frequency of the first band. That the center frequency of the second band is higher than the center frequency of the first band includes two cases: one case is that the two bands have an overlapped band, and the other case is that the two bands have no overlapped band. The first band can be selected as a positioning band of 1.55 GHz to 1.62 GHz, and the second band can be selected as a WIFI 2.4G band of 2.4 GHz to 2.5 GHz.

When the antenna structure is applied to the communications terminal, the length AC of the first antenna radiator 11 can be about 16 mm to 28 mm and the optional value is 20 mm, and the length AB from the first feed point B to the second end A of the first antenna radiator 11 can be about 0 to 18 mm and the optional value is 15 mm.

It should be noted that by properly adjusting the length of the first antenna radiator 11 and the structure and the value of the first impedance matching circuit M1, the first antenna radiator 11 can be applied to other bands. For example, the resonance bands of the first antenna radiator 11 can include at least two of a low band of 0.7 GHz to 0.96 GHz of primary antenna bands, an intermediate band of 1.71 GHz to 2.17 GHz of primary antenna bands, and a high band of 2.3 GHz to 2.69 GHz of primary antenna bands. For example, the first resonance band of the first antenna radiator 11 is 0.7 GHz to 0.96 GHz and the second resonance band of the first antenna radiator 11 is 1.71 GHz to 2.17 GHz, or the first resonance band of the first antenna radiator 11 is 0.7 GHz to 0.96 GHz and the second resonance band of the first antenna radiator 11 is 2.3 GHz to 2.69 GHz, or the first resonance band of the first antenna radiator 11 is 1.71 GHz to 2.17 GHz and the second resonance band of the first antenna radiator 11 is 2.3 GHz to 2.69 GHz.

When the second impedance matching circuit M2 includes the fourth capacitor C4, to ensure that radiation performance of the second antenna radiator 12 is desirable in its resonance band, the length DE of the second antenna radiator 12 and the position of the second feed point F can be designed to satisfy specific requirements.

For example, the length DE of the second antenna radiator 12 may be designed to be smaller than a 1/2 wavelength of a third band of resonance bands of the second antenna radiator 12, and may be selected to be close to a 1/4 wavelength of the third band. A length DF from the second feed point F to the second end D of the second antenna radiator 12 can be designed to be less than a 3/8 wavelength of a fourth band of resonance bands of the second antenna radiator 12, where a center frequency of the fourth band is higher than a center frequency of the third band. That the center frequency of the fourth band is higher than the center frequency of the third band includes two cases: one case is that the fourth band and the third band have an overlapped band; and the other case is that the fourth band and the third band have no overlapped band. The third band can be selected as a low band of 3.3 GHz to 3.8 GHz of a sub-6G band, and the fourth band can be selected as a high band of 4.4 GHz to 5 GHz of a sub-6G band.

When the antenna structure is applied to the communications terminal, the length DE of the second antenna radiator 12 can be about 6 mm to 15 mm and the optional value is 8 mm, and the length DF from the second feed point F to the second end D of the second antenna radiator 12 can be about 0 to 8 mm and the optional value is 6 mm. In addition, the length DE of the second antenna radiator 12 is greater than the length DF from the second feed point F to the second end D of the second antenna radiator 12.

It should be noted that by properly adjusting the length of the second antenna radiator 12 and the structure and the value of the second impedance matching circuit M2, the second antenna radiator 12 can be applied to other bands. For example, the resonance bands of the second antenna radiator 12 can include a WIFI 5G band of 5.15 GHz to 5.85 GHz. When the second antenna radiator 12 resonates in a WIFI 5G band, the length DE of the second antenna radiator 12 can be designed to be less than a ½ wavelength of the WIFI 5G band, and the length DF from the second feed point F to the second end D of the second antenna radiator 12 can be designed to be less than a ⅜ wavelength of the WIFI 5G band.

Figure 7:
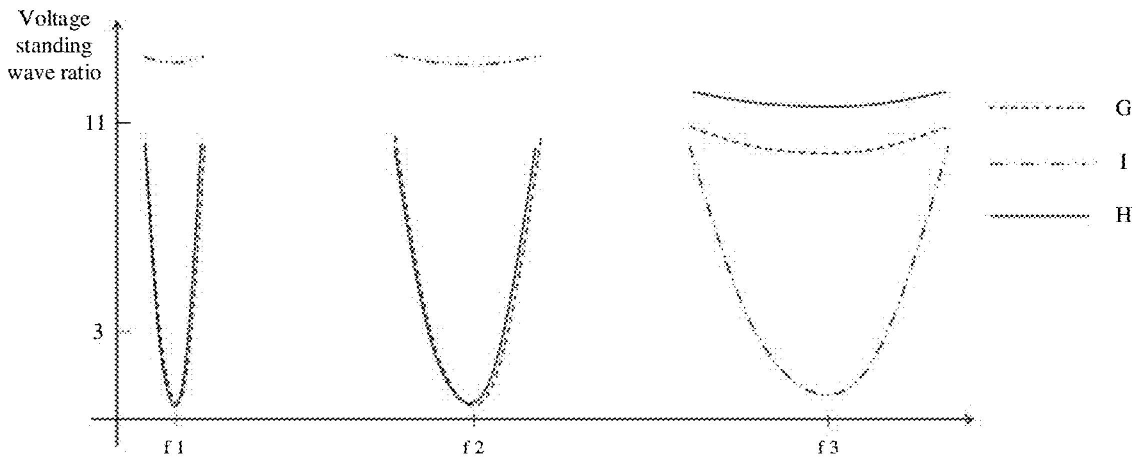
FIG. 7 is a schematic diagram of comparing voltage standing wave ratios of an antenna structure according to an embodiment of the present disclosure.

Referring to FIG. 7, FIG. 7 is a schematic diagram of comparing voltage standing wave ratios of an antenna structure. In FIG. 7, a dashed line G represents a voltage standing wave ratio of the antenna with only one antenna radiator in the related art, a solid line H represents a voltage standing wave ratio of the first signal source 13 in the antenna structure in the embodiments of the present disclosure, and a dashed line I represents a voltage standing wave ratio of the second signal source 14 in the antenna structure in the embodiments of the present disclosure. For example, the second antenna radiator 12 generates a resonance mode in a WIFI 5G band. It can be seen that the voltage standing wave ratio of the second signal source 14 in the WIFI 5G band significantly decreases, and antenna mismatch loss is greatly reduced.

For example, the antenna structure is applied to a bezel-less mobile terminal. In this case, the antenna clearance distance is about 1.2 mm, the length AC of the first antenna radiator 11 is about 20 mm, and the length DE of the second antenna radiator 12 is about 8 mm. The first impedance matching circuit M1 adopts the circuit structure including the first inductor L1, the first capacitor C1, the second inductor L2 and the second capacitor C2 as shown in FIG. 3, and the second impedance matching circuit M2 adopts the circuit structure including the fourth capacitor C4 as shown in FIG. 3. According to practical measurement, average antenna efficiency of the antenna structure in four bands of a positioning band, a WWI 2.4G band, a low band of 3.3 GHz to 3.8 GHz of a sub-6G band, and a high band of 4.4 GHz to 5 GHz of a sub-6G band is all higher than 30%, and isolation of both the first signal source 13 and the second signal source 14 in the four bands is greater than −10 dB.

It should also be noted that the first antenna radiator and the second antenna radiator can be a metal frame or a metal shell of the communications terminal, or a metal part inside the shell of the communications terminal. A specific material is not limited. The shapes of the first antenna radiator and the second antenna radiator can be straight or curved. A specific shape is not limited. Grounding in the embodiments of the present disclosure can be grounding through a motherboard, a metal shell, a metal plate, or the like. A specific form is not limited.

In the embodiments of the present disclosure, the communications terminal can be any device with a storage medium, for example, a terminal device such as a computer, a mobile phone, a tablet personal computer, a laptop computer, a personal digital assistant (PDA), a mobile Internet device (MID), a wearable device.

In the antenna structure of the embodiments of the present disclosure, on the basis of the antenna structure in the related art, an antenna radiator that resonates in different bands is added, and the two antenna radiators are stacked or disposed relative to each other, so that the antenna structure not only can work in multiple bands at the same time, but also can greatly reduce the space occupied by the antenna structure in the communications terminal.

The embodiments of the present disclosure also provide a communications terminal, including the antenna structure provided in any one of the embodiments in FIG. 1 and FIG. 3 to FIG. 6. In this embodiment, the communication terminal can achieve the same beneficial effects as the embodiments shown in FIG. 1 and FIG. 3 to FIG. 6. To avoid repetition, details are not repeated herein.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An antenna structure, applied to a communications terminal, comprising a first antenna radiator, a second antenna radiator, a first impedance matching circuit, a first signal source, and a second signal source; wherein the first antenna radiator and the second antenna radiator are stacked or disposed relative to each other, and there is a gap between the first antenna radiator and the second antenna radiator;

a length of the first antenna radiator is greater than a length of the second antenna radiator, and a resonance band of the first antenna radiator is less than a resonance band of the second antenna radiator;

a first end of the first antenna radiator is grounded, a second end of the first antenna radiator is an open end, the first antenna radiator is provided with a first feed point, the first feed point is connected to a first terminal of the first signal source through the first impedance matching circuit, and a second terminal of the first signal source is grounded; and a first end of the second antenna radiator is grounded, a second end of the second antenna radiator is an open end, the second antenna radiator is provided with a second feed point, the second feed point is connected to a first terminal of the second signal source, and a second terminal of the second signal source is grounded;

wherein the first impedance matching circuit comprises a first inductor and a first capacitor, a first terminal of the first inductor is connected to the first feed point, a second terminal of the first inductor is connected to a first terminal of the first capacitor, and a second terminal of the first capacitor is connected to the first terminal of the first signal source; and the first impedance matching circuit further comprises a second inductor and a second capacitor, a first terminal of the second inductor is connected to the second terminal of the first inductor, a second terminal of the second inductor is grounded, a first terminal of the second capacitor is connected to the first terminal of the second inductor, and a second terminal of the second capacitor is grounded.

2. The antenna structure according to claim 1, wherein when the first antenna radiator and the second antenna radiator are disposed relative to each other, the first end of the first antenna radiator is an end away from the second antenna radiator, and the first end of the second antenna radiator is an end away from the first antenna radiator.

3. The antenna structure according to claim 1, wherein the first impedance matching circuit further comprises: a third capacitor, a first terminal of the third capacitor is connected to the first terminal of the first inductor, and a second terminal of the third capacitor is connected to the second terminal of the first inductor.

4. The antenna structure according to claim 1, wherein the length of the first antenna radiator is between a $\frac{3}{16}$ wavelength and a $\frac{3}{8}$ wavelength of a first band of resonance bands of the first antenna radiator;

a length from the first feed point to the second end of the first antenna radiator is less than a $\frac{3}{8}$ wavelength of a second band of the resonance bands of the first antenna radiator, wherein a center frequency of the second band is higher than a center frequency of the first band; and a length from the first feed point to the first end of the first antenna radiator is greater than $\frac{1}{20}$ of the length of the first antenna radiator.

5. The antenna structure according to claim 1, further comprising: a second impedance matching circuit, wherein the second feed point is connected to the first terminal of the second signal source through the second impedance matching circuit.

6. The antenna structure according to claim 5, wherein the second impedance matching circuit comprises a fourth capacitor or a third inductor.

7. The antenna structure according to claim 6, wherein the length of the second antenna radiator is less than a $\frac{1}{2}$ wavelength of a third band of resonance bands of the second antenna radiator; and a length from the second feed point to the second end of the second antenna radiator is less than a $\frac{3}{8}$ wavelength of a fourth band of the resonance bands of the second antenna radiator, wherein a center frequency of the fourth band is higher than a center frequency of the third band.

8. The antenna structure according to claim 5, wherein the second impedance matching circuit comprises: a fourth capacitor and a third inductor; and a first terminal of the fourth capacitor is connected to the second feed point, a second terminal of the fourth capacitor is connected to the first terminal of the second signal source, a first terminal of the third inductor is connected to the second feed point, and a second terminal of the third inductor is grounded.

9. The antenna structure according to claim 5, wherein the second impedance matching circuit comprises: a fourth capacitor and a third inductor; and a first terminal of the fourth capacitor is connected to the second feed point, a second terminal of the fourth capacitor is connected to a first terminal of the third inductor, and a second terminal of the third inductor is connected to the first terminal of the second signal source.

10. The antenna structure according to claim 1, wherein when the first antenna radiator and the second antenna radiator are disposed relative to each other, a distance between the first antenna radiator and the second antenna radiator is from 0.3 mm to 2.5 mm.

11. The antenna structure according to claim 1, wherein the resonance bands of the first antenna radiator comprise a positioning band from 1.55 GHz to 1.62 GHz and a WIFI 2.4G band from 2.4 GHz to 2.5 GHz; or the resonance bands of the first antenna radiator comprise at least two of a low band from GHz to 0.96 GHz of primary antenna bands, an intermediate band from 1.71 GHz to 2.17 GHz of primary antenna bands, and a high band from 2.3 GHz to 2.69 GHz of primary antenna bands.

12. The antenna structure according to claim 1, wherein the resonance bands of the second antenna radiator comprise a low band from 3.3 GHz to 3.8 GHz of sub-6G bands and a high band from 4.4 GHz to 5 GHz of sub-6G bands; or the resonance bands of the second antenna radiator comprises a WIFI 5G band from 5.15 GHz to 5.85 GHz.

13. A communications terminal, comprising an antenna structure, wherein the antenna structure comprises a first antenna radiator, a second antenna radiator, a first impedance matching circuit, a first signal source, and a second signal source;

the first antenna radiator and the second antenna radiator are stacked or disposed relative to each other, and there is a gap between the first antenna radiator and the second antenna radiator;

a length of the first antenna radiator is greater than a length of the second antenna radiator, and a resonance band of the first antenna radiator is less than a resonance band of the second antenna radiator;

a first end of the first antenna radiator is grounded, a second end of the first antenna radiator is an open end, the first antenna radiator is provided with a first feed point, the first feed point is connected to a first terminal of the first signal source through the first impedance matching circuit, and a second terminal of the first signal source is grounded; and a first end of the second antenna radiator is grounded, a second end of the second antenna radiator is an open end, the second antenna radiator is provided with a second feed point, the second feed point is connected to a first terminal of the second signal source, and a second terminal of the second signal source is grounded;

wherein the first impedance matching circuit comprises a first inductor and a first capacitor, a first terminal of the first inductor is connected to the first feed point, a second terminal of the first inductor is connected to a first terminal of the first capacitor, and a second terminal of the first capacitor is connected to the first terminal of the first signal source; and the first impedance matching circuit further comprises a second inductor and a second capacitor, a first terminal of the second inductor is connected to the second terminal of the first inductor, a second terminal of the second inductor is grounded, a first terminal of the second capacitor is connected to the first terminal of the second inductor, and a second terminal of the second capacitor is grounded.

14. The communications terminal according to claim 13, wherein when the first antenna radiator and the second antenna radiator are disposed relative to each other, the first end of the first antenna radiator is an end away from the second antenna radiator, and the first end of the second antenna radiator is an end away from the first antenna radiator.

15. The communications terminal according to claim 13, wherein the first impedance matching circuit further comprises: a third capacitor, a first terminal of the third capacitor is connected to the first terminal of the first inductor, and a second terminal of the third capacitor is connected to the second terminal of the first inductor.

16. The communications terminal according to claim 13, wherein the length of the first antenna radiator is between a 3/16 wavelength and a 3/8 wavelength of a first band of resonance bands of the first antenna radiator;

a length from the first feed point to the second end of the first antenna radiator is less than a 3/8 wavelength of a second band of the resonance bands of the first antenna radiator, wherein a center frequency of the second band is higher than a center frequency of the first band; and a length from the first feed point to the first end of the first antenna radiator is greater than 1/20 of the length of the first antenna radiator.

17. The communications terminal according to claim 13, further comprising: a second impedance matching circuit, wherein the second feed point is connected to the first terminal of the second signal source through the second impedance matching circuit.

18. The communications terminal according to claim 17, wherein the second impedance matching circuit comprises a fourth capacitor or a third inductor.

19. The communications terminal according to claim 17, wherein the second impedance matching circuit comprises: a fourth capacitor and a third inductor; and a first terminal of the fourth capacitor is connected to the second feed point, a second terminal of the fourth capacitor is connected to the first terminal of the second signal source, a first terminal of the third inductor is connected to the second feed point, and a second terminal of the third inductor is grounded.

20. The communications terminal according to claim 17, wherein the second impedance matching circuit comprises: a fourth capacitor and a third inductor; and a first terminal of the fourth capacitor is connected to the second feed point, a second terminal of the fourth capacitor is connected to a first terminal of the third inductor, and a second terminal of the third inductor is connected to the first terminal of the second signal source.

* * * * *